United States Patent
Nguyen et al.

(10) Patent No.: US 9,794,059 B2
(45) Date of Patent: Oct. 17, 2017

(54) LIGHTWEIGHT CYBER SECURE BI-DIRECTIONAL AIRCRAFT COMMUNICATIONS ADDRESSING AND REPORTING SYSTEM (ACARS) TRANSMISSION

(71) Applicant: The Boeing Company, Chicago, IL (US)

(72) Inventors: Daniel Nguyen, Auburn, WA (US); Timothy M. Mitchell, Seattle, WA (US); Marissa A. Nishimoto, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 30 days.

(21) Appl. No.: 14/840,713

(22) Filed: Aug. 31, 2015

(65) Prior Publication Data

US 2017/0063529 A1     Mar. 2, 2017

(51) Int. Cl.
| | |
|---|---|
| H04L 9/00 | (2006.01) |
| H04L 9/06 | (2006.01) |
| H04L 9/08 | (2006.01) |
| H04L 29/06 | (2006.01) |
| G08G 5/00 | (2006.01) |
| H04W 12/10 | (2009.01) |

(52) U.S. Cl.
CPC ......... *H04L 9/0618* (2013.01); *G08G 5/0013* (2013.01); *H04L 9/0866* (2013.01); *H04L 9/0872* (2013.01); *H04L 63/0478* (2013.01); *H04L 63/068* (2013.01); *H04W 12/10* (2013.01)

(58) Field of Classification Search
CPC .. G08G 5/0013; G08G 5/0082; G08G 5/0021; G08G 5/0078
See application file for complete search history.

(56) References Cited

U.S. PATENT DOCUMENTS

| | | | |
|---|---|---|---|
| 2003/0030581 A1* | 2/2003 | Roy | H04B 7/18508 342/36 |
| 2003/0130770 A1 | 7/2003 | Matos | |
| 2004/0128039 A1* | 7/2004 | Podowski | G07C 5/008 701/33.4 |
| 2013/0158991 A1* | 6/2013 | Dong | G08G 5/0013 704/235 |

FOREIGN PATENT DOCUMENTS

WO   2015119679 A2   8/2015

OTHER PUBLICATIONS

Extended European Search Report for European Appl. No. 16182497.4 dated Nov. 4, 2016.

* cited by examiner

*Primary Examiner* — Ghazal Shehni
(74) *Attorney, Agent, or Firm* — MH2 Technology Law Group, LLP (57) ABSTRACT

The present invention generally relates to systems and methods for encrypting data. The disclosed techniques can include tracking a plurality of flight parameter values for a plurality of flight parameters of an aircraft, generating a first cryptographic key from the plurality of flight parameter values, encrypting plaintext using the first cryptographic key to generate a first ciphertext, and sending, from a sender to a receiver, a message comprising the first ciphertext.

20 Claims, 5 Drawing Sheets

FIG. 1

| | 202 | 204 | 206 | 208 | 210 | 212 | 214 | 216 |
|---|---|---|---|---|---|---|---|---|
| | SV POSITION X | 065 | BNR | 1 | 20 | METERS | +67108864 | ECEF |
| | X FINE POSITION | 066 | BNR | 1 | 14 | METERS | 64 | (4) |
| | SV POSITION Y | 070 | BNR | 1 | 20 | METERS | +67108864 | ECEF |
| | Y FINE POSITION | 071 | BNR | 1 | 14 | METERS | 64 | (4) |
| | SV POSITION Z | 072 | BNR | 1 | 20 | METERS | +67108864 | ECEF |
| | Z FINE POSITION | 073 | BNR | 1 | 14 | METERS | 64 | (4) |
| | UTC MEASUREMENT TIME | 074 | BNR | 1 | 20 | SECONDS | 10.0 | (3) |
| 218 | AUT GPS ALTITUDE | 076 | BNR | 1 | 20 | FEET | +131072 | UP |
| | AUT GPS HDOP | 101 | BNR | 1 | 15 | N/A | 1024 | (3) |
| | AUT GPS VDOP | 102 | BNR | 1 | 15 | N/A | 1024 | (3) |
| | AUT GPS TRACK ANGLE | 103 | BNR | 1 | 15 | DEGREES | +180 | CW-NORTH |
| 218 | AUT GPS LATITUDE | 110 | BNR | 1 | 20 | DEGREES | +180 | NORTH |
| 218 | AUT GPS LONGITUDE | 111 | BNR | 1 | 20 | DEGREES | +180 | EAST |
| 218 | AUT GPS GND SPEED | 112 | BNR | 1 | 15 | KNOTS | 4096 | (3) |
| | AUT GPS LAT. FINE | 120 | BNR | 1 | 11 | DEGREES | 180 * 2-20 | NORTH |
| | AUT GPS LONG. FINE | 121 | BNR | 1 | 11 | DEGREES | 180 * 2-20 | EAST |
| | UTC (BCD) | 125 | BCD | 1 | 5 | HR:MIN | 0.1 MINUTE | (3) |
| | HORIZ AUT. INTEGRITY LIMIT | 130 | BNR | 1 | 17 | NM | 16 | (3) |
| | VERTICAL AUT. INTEGRITY LIMIT | 133 | BNR | 1 | 17 | FEET | 32768 | (3) |
| | GPS VERTICAL FOM | 136 | BNR | 1 | 18 | FEET | 32768 | (3) |
| | UTC FINE | 140 | BNR | 1 | 20 | SECONDS | 1.0 | (4) |

LIGHTWEIGHT CYBER SECURE BI-DIRECTIONAL AIRCRAFT COMMUNICATIONS ADDRESSING AND REPORTING SYSTEM (ACARS) TRANSMISSION

FIELD OF THE INVENTION

This invention relates generally to sending data to, from, or within an aircraft in a secure manner.

BACKGROUND

Electrical systems of aircraft and other specialized vehicles typically include line-replaceable units (LRUs). LRUs are modular electronics systems, which perform various vehicle operations. LRUs generally have input and output electrical connections and an internal bus, typically a serial bus.

Aircraft LRUs may be categorized according to how critical they are to the aircraft operation, e.g., categorized according to criticality. The least critical LRUs are responsible for operations such as passenger in-flight entertainment, while the most critical LRUs are responsible for aircraft airworthiness, e.g., flight controls. For example, the Aircraft Control Domain (ACD) LRU is a most-critical LRU, the Aviation Information Systems (AIS) LRU is a middle-critical LRU, and the In-Flight Entertainment (AIF) LRU is a least-critical LRU. In commercial aviation, levels of criticality are stratified into Design Assurance Levels (DAL). They range from Level A to Level E. ACD is typically categorized as either Level A or Level B. AIS is typically categorized as Level C or D. Most IFE systems are categorized as Level E. The Table below presents DAL levels.

TABLE

| Level | Failure |
|---|---|
| A | Catastrophic |
| B | Hazardous |
| C | Major |
| D | Minor |
| E | No Effect |

Aircraft Communications Addressing and Reporting System (ACARS) is a digital datalink technique and set of standards for transmission of messages between aircraft and ground station and between different intra-aircraft LRUs. An example ACARS standard is the ARINC 429 Specification, available from Rockwell Collins. ACARS may be used for one-way communication or, by using multiple unidirectional systems, two-way communication. ACARS messages typically consist of one or more 32-bit "words", each of which may include one or more predefined fields that each may contain data values. Specific formats may vary, but in general, each ACARS word includes an 8-bit label (defining the word's data format) and a parity bit (used for error detection), leaving 23 bits available for message content or other data.

ACARS words may include a Source/Destination Identifier (SDI) field, which defines message routing parameters, e.g., by identifying a number of destination LRUs. This information, together with aircraft LRU topology information, determines the LRU(s) to which the message is sent. ACARS messages sent from a ground station to an aircraft may pass through a number of LRUs sequentially, e.g., from a least-critical LRU to a most-critical LRU. The data in the SDI field may be modified as an LRU transfers the message to the next LRU in the sequence in order to indicate the remaining LRUs to which the message is to be sent.

ACARS messages may be used to transfer bulk data, e.g., by employing the bit-oriented Williamsburg/Buckhorn protocol. Such a protocol may begin with a handshake message exchange as follows. The message sender sends a Request to Send (RTS) word, which may include any, or a combination, of the following: a timestamp, a destination code, and a word count. The message receiver responds with a Clear to Send (CTS) word, which also includes a timestamp, the destination code, and the word count. Once the message source receives and confirms the CTS, it may begin the bulk data transfer.

Currently, there is no efficient way to modify an aircraft to handle encrypted communications sent to and from its LRUs, without requiring a costly and time-consuming Federal Aviation Administration (FAA) recertification, e.g., via a Supplemental Type Certificate (STC).

SUMMARY

According to various embodiments, a method of encrypting data is presented. The method includes tracking a plurality of flight parameter values for a plurality of flight parameters of an aircraft; generating a first cryptographic key from the plurality of flight parameter values; encrypting plaintext using the first cryptographic key to generate a first ciphertext; and sending, from a sender to a receiver, a message comprising the first ciphertext.

Various optional features of the above embodiments include the following. The sender may include a ground station and the receiver may include the aircraft, and the sending may include sending wirelessly. The sender may include a first line-replaceable unit "LRU" and the receiver may include a second LRU. The tracking may include tracking at least some of the flight parameter values for a time represented by a timestamp in a message. The flight parameter values may include data from at least one Aircraft Communications Addressing and Reporting System "ACARS" message. The generating may include extracting a plurality of least significant bits from values in a plurality of fields of a message. The method may further include selecting the flight parameters from a plurality of information options available to both a ground station and the aircraft. The method may include generating a second cryptographic key from the flight parameter values; and further encrypting the first ciphertext using the second cryptographic key to produce a second ciphertext. The method may further include decrypting the ciphertext to obtain the plaintext. The encrypting may include applying exclusive or "XOR" logic to the first cryptographic key and to the plaintext.

According to various embodiments, computer readable media comprising computer-interpretable instructions are presented. The computer-interpretable instructions, when executed by at least one electronic processor, cause the at least one electronic processor to perform a method of encrypting data, the method including: tracking a plurality of flight parameter values for a plurality of flight parameters of an aircraft; generating a first cryptographic key from the plurality of flight parameter values; encrypting plaintext using the first cryptographic key to generate a first ciphertext; and sending, from a sender to a receiver, a message comprising the first ciphertext.

Various optional features of the above embodiments include the following. The sender may include a ground station and the receiver may include the aircraft, where the sending may include sending wirelessly. The sender may include a first line-replaceable unit "LRU" and the receiver may include a second LRU. The tracking may include tracking at least some of the flight parameter values for a time represented by a timestamp in a message. The flight parameter values may include data from at least one Aircraft Communications Addressing and Reporting System "ACARS" message. The generating may include extracting a plurality of least significant bits from values in a plurality of fields of a message. The computer readable media may further include computer-interpretable instructions which, when executed by at least one electronic processor, cause the at least one electronic processor to select the flight parameters from a plurality of information options available to both a ground station and the aircraft. The computer readable media may further include computer-interpretable instructions which, when executed by at least one electronic processor, cause the at least one electronic processor to: generate a second cryptographic key from the plurality of flight parameter values; and further encrypt the first ciphertext using the second cryptographic key to produce a second ciphertext. The computer readable media may further include computer-interpretable instructions which, when executed by at least one electronic processor, cause the at least one electronic processor to decrypt the ciphertext to obtain the plaintext. The encrypting may include applying exclusive or "XOR" logic to the first cryptographic key and to the plaintext.

BRIEF DESCRIPTION OF THE DRAWINGS

Various features of the embodiments can be more fully appreciated, as the embodiments become better understood with reference to the following detailed description, when considered in connection with the accompanying figures, in which.

DESCRIPTION OF EMBODIMENTS

Reference will now be made in detail to the present embodiments (exemplary embodiments) of the invention, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

Communications to and from an aircraft, as well as communications within an aircraft, present gaps in aviation cyber security. Some embodiments improve the security of such communications by providing a software solution that does not require the installation of additional hardware in the aircraft. This keeps the overall cost low, because the solution can be offered as a software upgrade to work with existing hardware. Note that adding hardware to an in-service aircraft generally requires a costly and time-consuming Federal Aviation Administration (FAA) recertification, e.g., via a Supplemental Type Certificate (STC). Consequently, some embodiments provide aircraft currently in service with the ability to greatly improve their communication security posture, without the overhead of an FAA recertification. Some embodiments are thus appealing to airlines and other aircraft providers.

Figure 1:
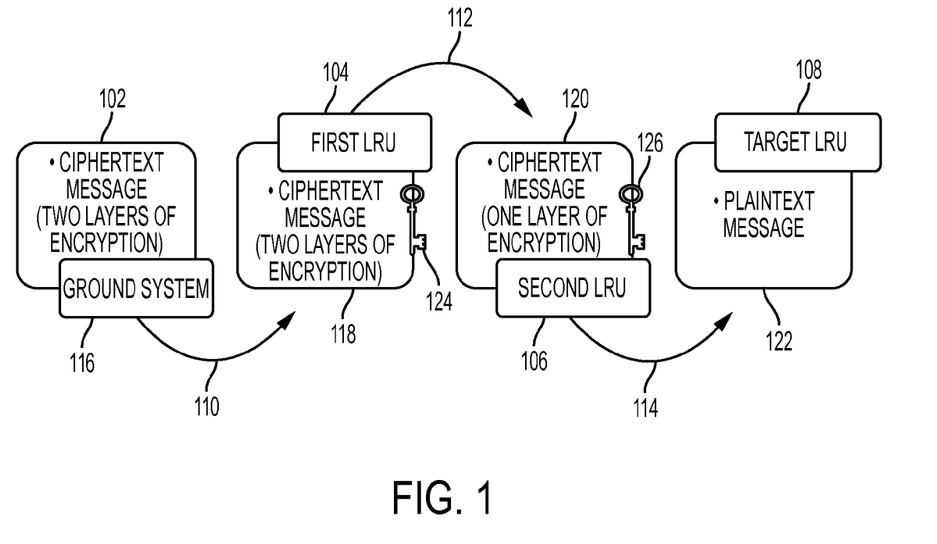
FIG. 1 is a high-level schematic diagram of a system according to some embodiments.

FIG. 1 is a high-level schematic diagram of a system according to some embodiments. In particular, FIG. 1 depicts by way of non-limiting example ACARS plaintext message 102 sent 110 securely from ground station 116 to aircraft 108. Note that message 102 passes through multiple avionics busses, each of which may be internal to and serve a different LRU 104, 106, 108.

At a high level, some embodiments utilize a count of hops 112, 114 between LRUs that ACARS message 102 takes to reach its target LRU 108. Each hop 112, 114 may utilize a respective bus of respective LRU 104, 106 in which a query is made to obtain flight parameter information that is used to generate a distinct decryption key 124, 126. Each such decryption key 124, 126 is used to decrypt a message layer. Each hop 112, 114 thus corresponds to an additional layer of decryption using an associated key 124, 126. In general, additional hops correspond to the same or a higher level of criticality. Message 102 therefore went through two layers of encryption before it got sent 110, after which it undergoes two layers of decryption as depicted in FIG. 1.

Thus, ground system 116 produces and sends 110 ciphertext message 102 with two layers of encryption to first LRU 104. Next, first LRU 104 generates first key 124 and uses it to decrypt the first layer of ciphertext message 118 with two layers of encryption to produce ciphertext message 120 with one layer of encryption. LRU 104 then sends 112 ciphertext message 120 to second LRU 106. Second LRU 106 generates second key 126 and uses it to decrypt the second layer to produce plaintext message 122, which it sends 114 to target LRU 108.

In more detail, some embodiments use flight parameters to generate one or more cryptographic keys. Suitable such flight parameters include ACARS gate Out, wheels Off, wheels On, and gate In (OOOI) data, e.g., least-significant bits thereof. Use of such data allows embodiments to be very granular and encrypt each ACARS message with its own unique key(s). The encryption and decryption operations may be accomplished by applying an exclusive OR (XOR) logical operation bitwise to a key and to the message. For encryption and subsequent decryption, both endpoints (e.g., ground station and aircraft) obtain the correct encryption key(s), one for each layer.

Some embodiments utilize ACARS Request to Send (RTS) and Clear to Send (CTS) message types for an initial message sync operation. These transactions have associated timestamp values, which may be used to pull the associated flight parameter value(s) from the respective avionics bus (ses). That is, timestamps in RTS and/or CTS ACARS messages may be used to identify times for which associated flight parameter values may be retrieved and used to generate one or more cryptographic keys.

Using multiple layers of encryption, each corresponding to a different LRU, provides several advantages. For example, using multiple LRUs mitigates a bottleneck that could happen when a large quantity of data is sent to the same destination. Some embodiments exploit the diversity of routing among the LRUs to avoid having any one LRU doing a large percentage of the multiple encryptions or decryptions. Another advantage is that as the message progresses to its destination LRU, the data generally moves from a less secure are of the network to a more secure area of the network. That is, messages are generally routed to LRU's of non-decreasing criticality (e.g., the same or higher criticality as routing progresses). This means that as encryption layers are removed, the resulting message is transferred more secure portions of the avionics network.

Thus, disclosed embodiments leverage the disclosed systems and techniques to perform multiple aircraft-flight-parameter-based encryptions (and corresponding decryptions) for each message. The overall risk level presented according to some embodiments is low, in that resources required to crack the encrypted messages are estimated to be greater than or equal to those available to a sovereign state.

Figure 2:
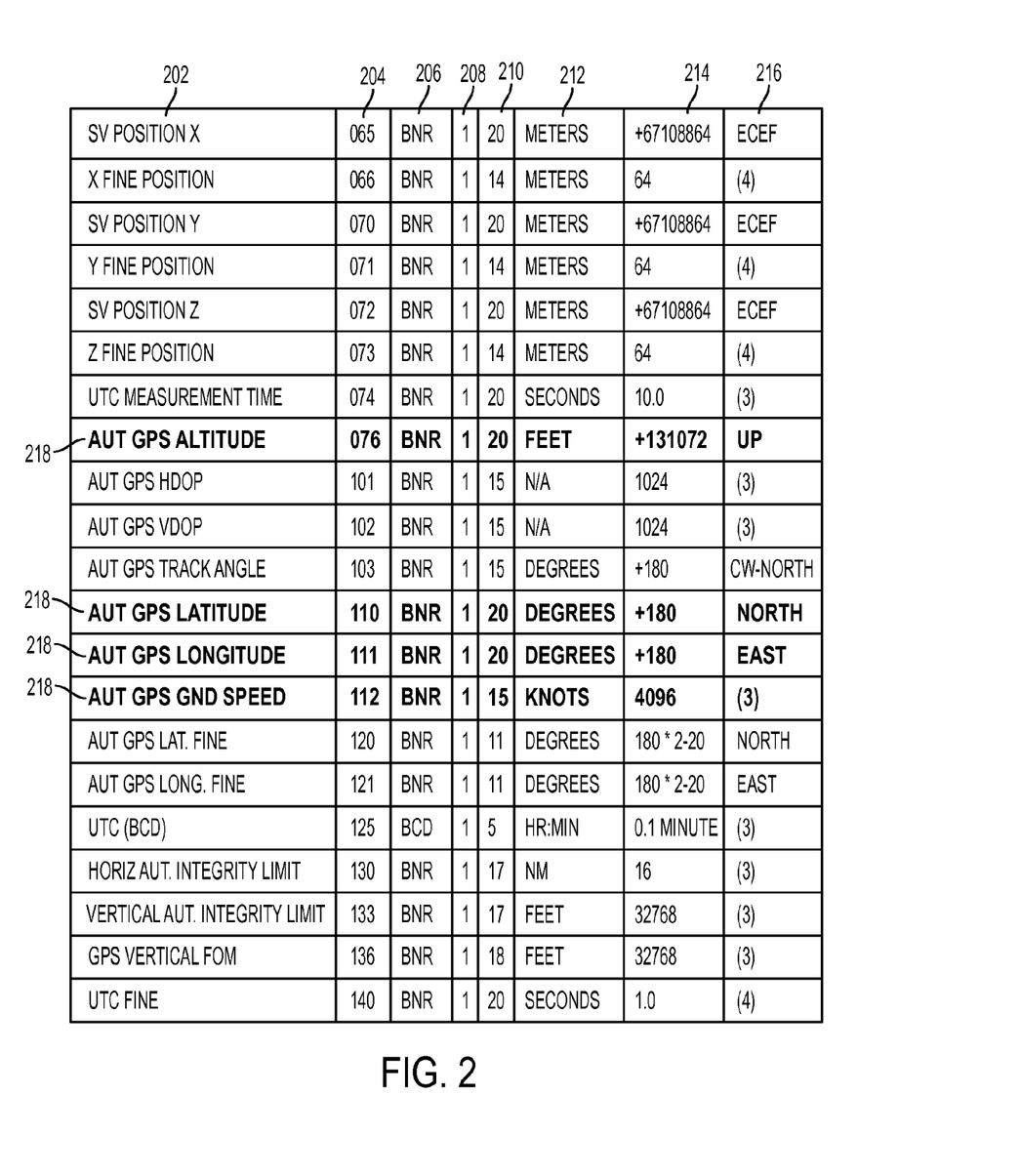
FIG. 2 depicts an example ACARS transmission.

FIG. 2 depicts an example ACARS transmission. Note that the particular fields shown in FIG. 2 are non-limiting examples only; actual embodiments may utilize different data fields. Each row depicted in FIG. 2 represents a single 32-bit ACARS word. Column 202 is a description of the word and is not included in the actual message. Column 204 is an 8-bit octal label, or "Information Identifier", indicting the type of data represented, e.g., binary-coded decimal (BCD), binary (BNR), discrete data, etc. Column 206 holds a description of the data value in the label column 204 and is not part of the actual message. Column 208 is for a parity bit, used for error detection. Column 210 is the Source/Destination Identifier (SDI), which indicates a maximum number of receivers (e.g., LRUs) for that particular word. Note that because the aircraft's LRUs are connected in a known topological arrangement, the value in column 210 defines the destination LRU(s) for that word. Column 212 is a description of the units applicable to the contents of column 214 and is not part of the actual word. Column 214 is for the data value, expressed in the format specified in column 204. Column 216 is the Sign/Status Matrix field (SSM), used in conjunction with the data of column 204 to provide additional parameters such as sign (positive or negative), orientation (north, south, west, east), direction (left or right), etc.

Note that rows 218, namely, altitude, latitude, longitude, and ground speed include data that is highly variable. Least-significant bits, for example, of the data fields of rows 218 may be used to generate an encryption key as disclosed herein.

Figure 3:
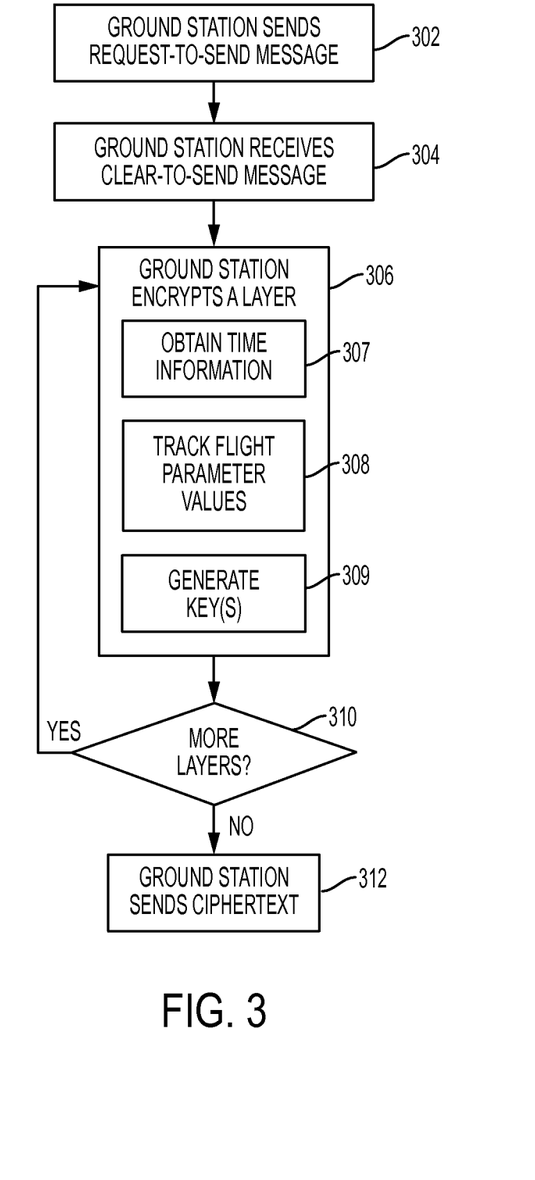
FIG. 3 is a flowchart depicting an encryption technique according to some embodiments.

FIG. 3 is a flowchart depicting an encryption technique according to some embodiments. The technique of FIG. 3 may be implemented using existing avionics and ground-station equipment as modified by software stored in non-transitory persistent memory and executing on one or more hardware electronic processors. For example, the technique of FIG. 3 may be implemented using the system shown and described in reference to FIG. 5.

At block 302, a ground station (e.g., 506 of FIG. 5) initiates communication with an aircraft (e.g., aircraft 502 of FIG. 5) by sending a RTS ACARS message. The RTS message may be part of a Williamsburg/Buckhorn protocol, a related protocol, or a different protocol. The RTS message of block 302 includes a timestamp indicating a time at which it was sent. The RTS message is typically conveyed from a computer that forms the message (e.g., processor(s) 510 of FIG. 5) to a wireless transmitter interface (e.g., wireless transmitter interface 508 of FIG. 5), which converts the data into radio-frequency (RF) energy for transmission to the aircraft via an antenna (e.g., antenna 504 of FIG. 5). Note that the transmission may include the usage of an intermediary, such as a satellite.

At block 304, the ground station receives a CTS message from the aircraft in response to the RTS message of block 302. The CTS message may be part of a Williamsburg/Buckhorn protocol, a related protocol, or a different protocol. The CTS message includes a timestamp indicating a time at which the aircraft sent it. The CTS message is typically sent by the aircraft in the form of RF energy, which is captured by an antenna at the ground station, possibly after having been sent through an intermediary such as a satellite.

Note that the use of RTS and CTS words for obtaining timestamps used to derive the time information is by way of non-limiting example; timestamp information may be alternately drawn from any ACARS message.

At block 306, the ground station prepares data for transmission to the aircraft by encrypting it according to techniques disclosed herein. The encryption operation can involve several sub-steps: obtaining time information 307, tracking corresponding flight parameter values 308, and generating one or more encryption keys 309. According to some embodiments, the encryption may proceed as follows.

The ground station identifies the destination LRU within the aircraft to which the message is intended. The ground station determines whether the message must pass through additional LRUs on its way to the destination LRU, and if so, how many. The ground station may make the determination by referencing information that it has stored in persistent memory (e.g., computer readable media 512 of FIG. 5) regarding the LRU bus topology present in the aircraft. That is, the ground station may have access to information that describes where in the aircraft's LRU topology the destination LRU resides.

The ground station also generates one or more encryption keys based on time information (derived at block 307) and flight parameter values (tracked at block 308) known to both the ground station and the aircraft. The time information may be derived from the timestamps present in the RTS and/or CTS messages. The time information may specify one or more times for which the flight parameter values are to be sampled to obtain key data. That is, some embodiments obtain a plurality of bit values from the flight parameter values as they are determined at times specified by the time information. These bit values are used to build one or more cryptographic key(s). For example, some embodiments may determine the time information as the times specified by the timestamps from the RTS and CTS messages. Some embodiments determine the time information as a function of one or both timestamp values. Such a function may input the timestamp values and output the timestamp values and/or additional time values relative to the timestamp values, e.g., prior to, between, and/or subsequent to the timestamp values. By way of non-limiting example, the time information may include the timestamp values together with additional time values, e.g., a plurality of times prior to and/or subsequent to the timestamp values. The number of times may range from zero to thousands, and the length of the temporal intervals between each additional time value may be any value from, e.g., one millisecond to one second.

Note that both the ground station and the aircraft track the flight parameter values described herein. For some embodiments, the aircraft and the ground station independently measure one or more flight parameter values of the aircraft. For some embodiments, the aircraft and/or ground station convey flight parameter values to their counterpart, e.g., for flight parameters that cannot be, or were not, independently measured. The conveyance may be according to ACARS messages, such as that depicted in FIG. 2 herein. Some embodiments use a combination of techniques, e.g., using flight parameter values that are both measured directly and obtained from a counterpart.

Once the ground station identifies the time information, it proceeds to draw data from flight parameter values for the times specified by the time information I order to construct a key. Many different flight parameter values are suitable for use within embodiments. Example such flight parameters include OOOI ACARS message data. Suitable flight parameters include aircraft altitude, aircraft longitude, aircraft latitude, and/or aircraft ground speed. Values for such parameters may be determined using a Global Positioning System (GPS). In general, embodiments draw flight parameter values corresponding to the times of the time information determined at block 307.

Some embodiments, per block 309, generate one or more cryptographic keys from the flight parameter values at the time information times. Any of a variety of key generation techniques may be used. Some embodiments may concatenate the flight parameter values at the time information times to produce a string of numbers, which may be considered as their corresponding binary forms in order to obtain bit values that include one or more cryptographic keys. Some embodiments pull least-significant bit values from the flight parameter values at the time information times. Some embodiments pull next-to-least significant bit values, and/or next-to-next-to-least significant bit values, and so on. That is, some embodiments extract a series of bits from each flight parameter value, where the series of bits includes the least significant bit and one or more additional bits of low significance. The pulled bit values may then be concatenated together or otherwise combined to form a key. Other techniques for combining the bit values to form a key include XOR, adding, subtracting, concatenating, interleaving, and any combination of the aforementioned techniques.

The ground station then uses the generated key to encrypt the plaintext, or, for additional layers of encryption, an existing already-encrypted ciphertext message. The encryption may be of any of a variety of forms. Some embodiments apply XOR bitwise to the key and to the message. If the message length exceeds the key length, the key can be repeatedly used by concatenating copies of the key together, or the key can be used to generate a stream of bit values to be used as the final key by inputting it to a pseudorandom number generator, for example. Other encryption techniques include generating additional bit values for the key by use of a pseudorandom number generator, stream ciphers applied to the message and key, and block ciphers applied to the message and key. Encryption techniques that commute are particularly useful as described herein. An encryption technique is said to "commute" if $K_1(K_2(M))=K_2(K_1(M))$, where "K(M)" means encryption of message M using key K.

Some embodiments handle the SDI data separately from the remainder of the word. In general, the encryption can be applied to the entire message, including any SDI field data, to the body of the message only (e.g., the non-SDI word portion), or to any combination thereof. Thus, embodiments may encrypt message routing information or leave such information in plaintext. In more detail, some embodiments leave the SDI data either unencrypted or encrypted using a key defined by predetermined flight parameter values. That is, some embodiments leave the SDI field unencrypted so that the message receiver may easily obtain the routing information contained therein. The message receiver may use the routing information to identify the number of encryption layers, for example. Other embodiments encrypt the SDI data using only a single layer of encryption. Such embodiments may use a previously agreed-upon flight parameter at a time defined by the time information to generate an SDI encryption key, which is used to encrypt the SDI data. Such embodiments may encrypt the SDI data using the same key used to encrypt a particular layer of the message body, e.g., the key used to encrypt the first layer of the message body. Such embodiments may encrypt the remainder of the message as disclosed herein.

At block 310, the ground station determines whether additional encryption layers are to be applied, e.g., as determined by counting message hops as indicated above. If so, then the process flow reverts to block 306. Otherwise, the process flow proceeds to block 312.

At block 312, the ground station sends out the encrypted message. The ground station may send the message our using existing ACARS message sending techniques. The message may be sent directly to the aircraft, or indirectly, e.g., via a satellite.

Figure 4:
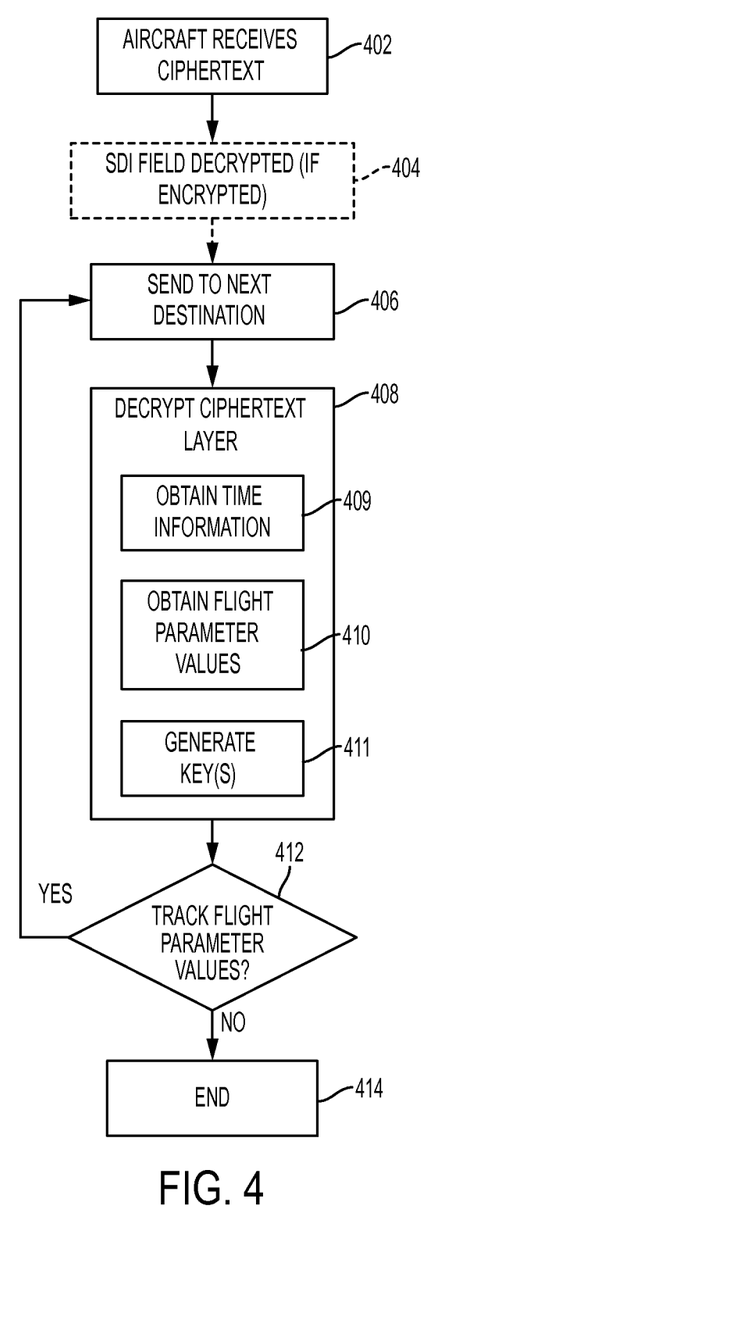
FIG. 4 is a flowchart depicting a decryption technique according to some embodiments.

FIG. 4 is a flowchart depicting a decryption technique according to some embodiments. The decryption technique of FIG. 4 may be complementary to the encryption technique of FIG. 3, in that the decryption technique may be applied to a message encrypted and sent by the technique of FIG. 3 to obtain the plaintext. Thus, the technique of FIG. 4 may be implemented using existing avionics equipment as modified by software stored in non-transitory persistent memory and executing on one or more hardware electronic processors. For example, the technique of FIG. 4 may be implemented using existing LRU hardware aboard an aircraft. The ground station and aircraft of FIG. 4 may be ground station 506 and aircraft 502 of FIG. 5, respectively.

At block 402, the aircraft receives a ciphertext (e.g., 118). The ciphertext may be a ciphertext as generated and sent according to the technique shown and described in reference to FIG. 3. The aircraft may receive the message using existing RF communication hardware, e.g., as used to receive ACARS messages. The aircraft may receive the ciphertext message at an initial LRU or at an alternative location.

At block 404, the aircraft decrypts the message SDI data if it is encrypted. Note that the actions of this block occur for embodiments that encrypt the SDI data. Embodiments that leave the SDI data in plaintext may omit this block. For embodiments that do encrypt the SDI data, the actions of this block reveal routing information for the message, e.g., a destination LRU to which the message is to be sent. The aircraft may store a description of its network topology in persistent memory so that it may derive a sequential list of LRUs to which the message is to be sent before arriving at the destination LRU. The SDI data decryption may include deriving a key from previously agreed-upon flight parameter values at times defined by the time information, and/or using the same key used to decrypt a first layer of the non-SDI message portion. Note that after this block (for embodiments that include this block) or after the previous block (for embodiments that omit block 404), the routing information for the message may be available to the aircraft in plaintext form.

At block 406, the aircraft avionics system routes the message to the next destination within the aircraft. The destination may be determined by electronically parsing and examining the message to obtain routing information, e.g., present in the SDI data field. The aircraft then routes the message to its next indicated destination, e.g., using an ACARS protocol. The number in the SDI field may be accordingly decremented at this point.

At block 408, the aircraft decrypts a layer of ciphertext. The actions of this block can include several sub-steps, including: obtaining time information 409, tracking corresponding flight parameter values 410, and generating one or more decryption keys 411.

The aircraft may obtain time information at block 409 in a similar manner to that of the ground station. That is, the aircraft may obtain time information by extracting timestamps from one or both of the RTS and CTS words, and then deriving the time information therefrom as described above in reference to block 307 of FIG. 3 above. Note that the use of RTS and CTS words for obtaining timestamps used to derive the time information is by way of non-limiting example; timestamp information may be alternately drawn from any ACARS message.

The aircraft may track flight parameter values at block 410 in a similar manner to that of the ground station. For example, it may draw data from flight parameter values for the times specified by the time information. Example suitable flight parameter values are described above in reference to block 410 of FIG. 3. Example such flight parameters include OOOI ACARS message data. In general, embodiments drawn flight parameter values corresponding to the times of the time information determined at block 409.

The aircraft generated one or more encryption keys at block 411. The aircraft may use the same process as used by the ground station at block 309. That is, the aircraft may generate one or more cryptographic keys from the flight parameter values at the time information times as disclosed above in reference to block 309.

At block 412, the aircraft determines whether the message is to be conveyed to an additional destination, e.g., an LRU. The aircraft may do this by examining the SDI data and consulting with a stored representation of the aircraft's LRU topology in order to determine whether any LRUs exist between the current LRU and the destination LRU. If so the aircraft routes the message to the next LRU in the sequence. If not, process flow passes to block 414.

At block 414, the process may end.

Figure 5:
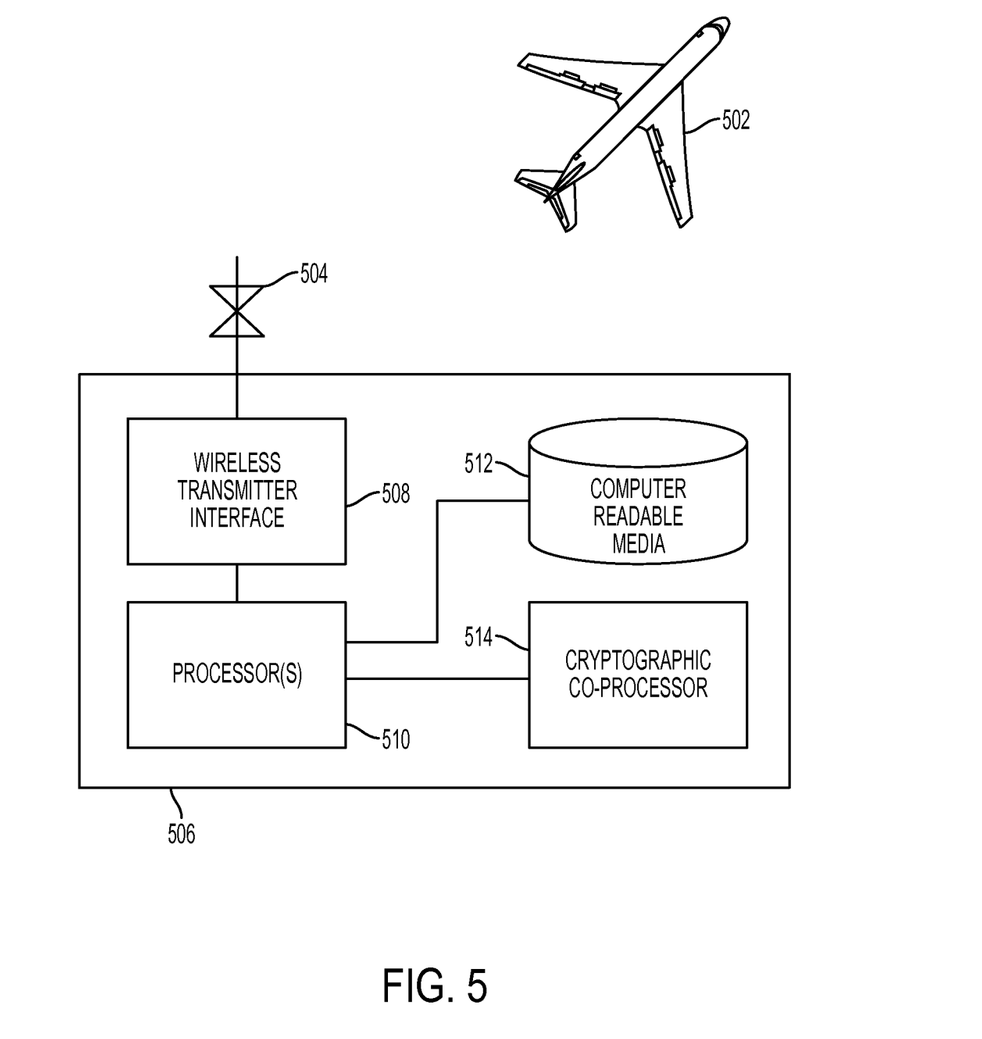
FIG. 5 depicts example implementation hardware according to some embodiments.

FIG. 5 depicts example implementation hardware according to some embodiments. The techniques disclosed herein, e.g., in reference to FIGS. 3 and 4, may be implemented using the system shown and described in reference to FIG. 5. In particular, FIG. 5 depicts aircraft 502 in communication with ground station 506. Aircraft 502 may be any type of aircraft, not limited to fixed-wing airplanes. Thus, aircraft 502 may be a helicopter, for example. Ground station may be included within, or distinct from, a terrestrial air traffic control system.

Ground station 506 may include one or more electronic processors 510, communicatively coupled to computer readable media 512 (e.g., persistent memory), cryptographic co-processor 514, and wireless transmission interface 508. Processor(s) 510 may form part of an electronic computer, for example. Cryptographic co-processor 514 may be used to perform the cryptographic operations disclosed herein. Wireless transmission interface 508 may be coupled to antenna 504, which sends data wirelessly to aircraft 502. Computer readable media 512 may include computer-interpretable instructions which, when executed by processor(s) 510 and/or cryptographic co-processor 514, cause ground station 506 to perform one or more of the techniques disclosed herein, e.g., the technique of FIG. 3.

Note that although FIGS. 3 and 4 depict ground-station-to-aircraft communication, embodiments may also provide for communications in the opposite direction, that is, from aircraft to ground station. Embodiments are not limited to the communications between the example endpoints described herein. For example, embodiments may be used for intra-aircraft communication, or communication between aircraft.

Certain embodiments described above can be performed in part using a computer application or program. The computer program can exist in a variety of forms, both active and inactive. For example, the computer program can exist as one or more software programs, software modules, or both, that can be comprised of program instructions in source code, object code, executable code or other formats, firmware program(s), or hardware description language (HDL) files. Any of the above can be embodied on a computer readable medium, which can include computer readable storage devices and media in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes.

Those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A method of encrypting data, the method comprising:
   tracking a plurality of flight parameter values for a plurality of flight parameters of an aircraft;
   deriving a cryptographic key from the plurality of flight parameter values;
   encrypting plaintext using the cryptographic key to generate a ciphertext; and
   transmitting, from a sender to a receiver, a message comprising the ciphertext.

2. The method of claim 1, wherein the sender comprises a ground station and the receiver comprises the aircraft, and wherein the transmitting comprises transmitting wirelessly.

3. The method of claim 1, wherein the sender comprises a first line-replaceable unit ("LRU") and the receiver comprises a second LRU.

4. The method of claim 1, wherein the tracking comprises tracking at least some of the flight parameter values for a time represented by a timestamp in a message.

5. The method of claim 1, wherein the flight parameter values are comprised of data from at least one Aircraft Communications Addressing and Reporting System (ACARS) message.

6. The method of claim 1, wherein the deriving comprises extracting a plurality of least significant bits from values in a plurality of fields of a message.

7. The method of claim 1, further comprising selecting the flight parameters from a plurality of information options available to both a ground station and the aircraft.

8. The method of claim 1, further comprising:
deriving a second cryptographic key from the flight parameter values; and
further encrypting the ciphertext using the second cryptographic key.

9. The method of claim 1, further comprising decrypting the ciphertext to obtain the plaintext.

10. The method of claim 1, wherein the encrypting comprises applying exclusive or (XOR) logic to the cryptographic key and to the plaintext.

11. At least one non-transitory storage medium comprising computer-interpretable instructions which, when executed by at least one electronic processor, cause the at least one electronic processor to perform a method of encrypting data, the method comprising:
tracking a plurality of flight parameter values for a plurality of flight parameters of an aircraft;
deriving a cryptographic key from the plurality of flight parameter values;
encrypting plaintext using the cryptographic key to generate a ciphertext; and
transmitting, from a sender to a receiver, a message comprising the ciphertext.

12. The computer readable media of claim 11, wherein the sender comprises a ground station and the receiver comprises the aircraft, and wherein the transmitting comprises transmitting wirelessly.

13. The computer readable media of claim 11, wherein the sender comprises a first line-replaceable ("LRU") unit and the receiver comprises a second LRU.

14. The computer readable media of claim 11, wherein the tracking (308) comprises tracking at least some of the flight parameter values for a time represented by a timestamp in a message.

15. The computer readable media of claim 11, wherein the flight parameter values are comprised of data from at least one Aircraft Communications Addressing and Reporting System ("ACARS") message.

16. The computer readable media of claim 11, wherein the deriving comprises extracting a plurality of least significant bits from values in a plurality of fields of a message.

17. The computer readable media of claim 11, further comprising computer-interpretable instructions which, when executed by at least one electronic processor, cause the at least one electronic processor to select the flight parameters from a plurality of information options available to both a ground station and the aircraft.

18. The computer readable media of claim 11, further comprising computer-interpretable instructions which, when executed by at least one electronic processor, cause the at least one electronic processor to:
derive a second cryptographic key from the plurality of flight parameter values; and
further encrypt the ciphertext using the second cryptographic key.

19. The computer readable media of claim 11, further comprising computer-interpretable instructions which, when executed by at least one electronic processor, cause the at least one electronic processor to decrypt the ciphertext to obtain the plaintext.

20. The computer readable media of claim 11, wherein the encrypting comprises applying exclusive or (XOR) logic to the cryptographic key and to the plaintext.

* * * * *